(12) United States Patent
Sugaya

(10) Patent No.: US 6,239,787 B1
(45) Date of Patent: *May 29, 2001

(54) DISPLAY METHOD, DISPLAY APPARATUS AND COMMUNICATION METHOD

(75) Inventor: Shigeru Sugaya, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/010,338

(22) Filed: Jan. 26, 1998

(30) Foreign Application Priority Data

Jan. 23, 1997 (JP) .................................................. 9-010433
Mar. 31, 1997 (JP) .................................................. 9-081047

(51) Int. Cl.[7] ............................... G09G 5/00; H04Q 7/32
(52) U.S. Cl. ....................... 345/169; 345/121; 345/126; 345/901; 345/102; 455/566; 455/226.2
(58) Field of Search ........................ 379/58, FOR 103; 455/426, 566, 226.2–226.4; 340/825.44; 345/114–126, 140, 141, 102, 150, 169, 55, 56, 88, 59, 87, 901

(56) References Cited

U.S. PATENT DOCUMENTS

| 4,642,710 | 2/1987 | Murtha et al. ......................... 360/79 |
| 5,363,223 | * 11/1994 | Beesley ................................. 359/48 |
| 5,375,043 | * 12/1994 | Tokunaga ............................... 362/31 |
| 5,406,268 | 4/1995 | Fullmer ............................ 340/815.42 |
| 5,712,654 | * 1/1998 | Kawashima et al. ................. 345/115 |
| 5,870,683 | * 2/1999 | Wells et al. .......................... 455/566 |
| 5,936,679 | * 8/1999 | Kasahara et al. .................... 348/553 |

FOREIGN PATENT DOCUMENTS

| 0686949 | 12/1995 | (EP) ................................ G08B/5/22 |
| 2314184 | 12/1997 | (GB) ................................ G08B/7/06 |

* cited by examiner

Primary Examiner—Bipin Shalwala
Assistant Examiner—Jimmy H. Nguyen
(74) Attorney, Agent, or Firm—Jay H. Maioli

(57) ABSTRACT

In electronic equipment such as a communication apparatus or the like, a state of the electronic equipment can satisfactorily be displayed. At least two states of the electronic equipment can be displayed by using figures (P1 to P9) represented by changes of expressions of face portion different from one another.

25 Claims, 13 Drawing Sheets

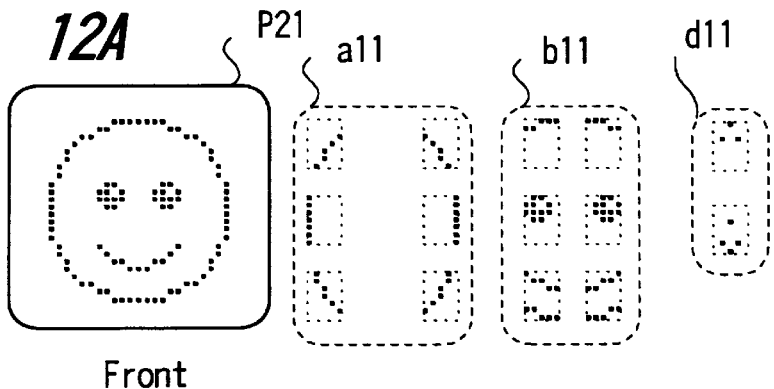
FIG. 12A Front
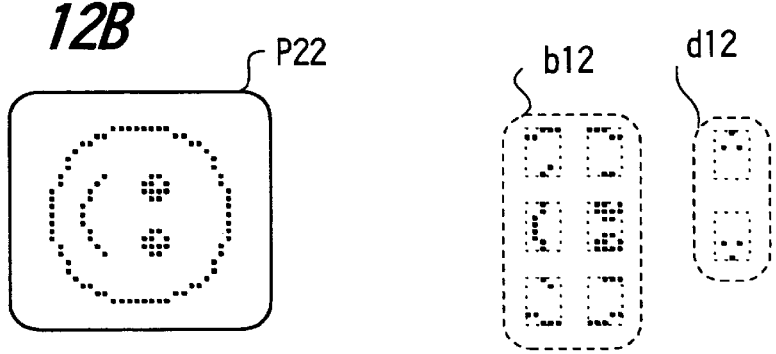
FIG. 12B Rotated by 90°
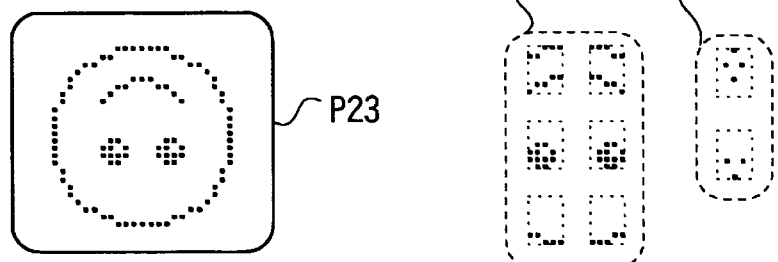
FIG. 12C Rotated by 180°
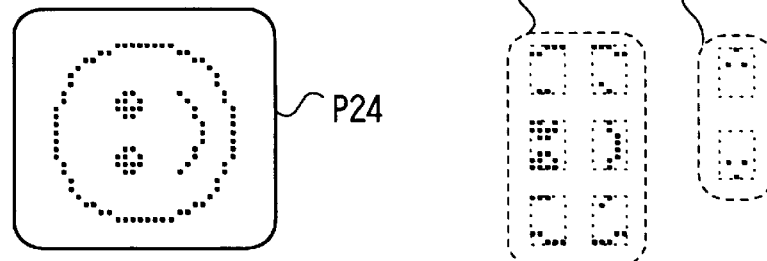
FIG. 12D Rotated by 270°

FIG. 15
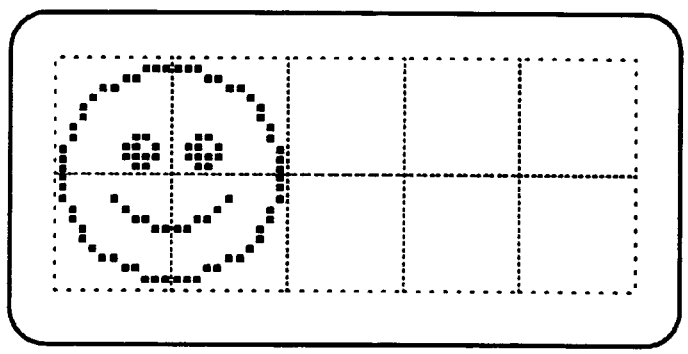
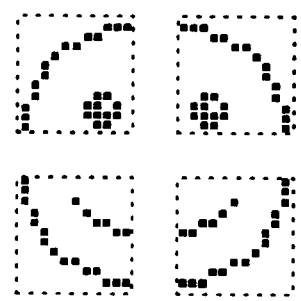
FIG. 16
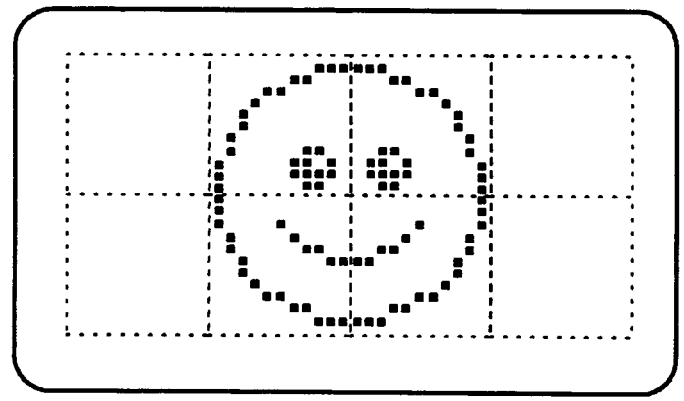
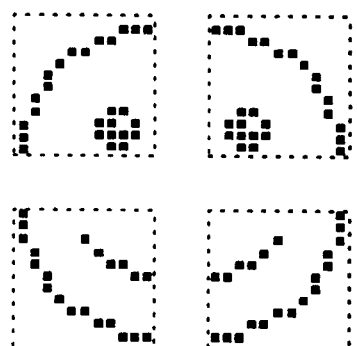

DISPLAY METHOD, DISPLAY APPARATUS AND COMMUNICATION METHOD

BACKGROUND OF THE INVENTION

1. Field of the Invention

The present invention relates to a display method and a display apparatus applied to various electronic equipments and a communication apparatus such as a portable radio telephone or the like to which the display apparatus is applied

2. Background of the Invention

Various radio telephone systems employing communication apparatus called portable telephones have been put into practice. In each of the radio telephone systems, basically, a plurality of base stations are disposed at a predetermined interval, and a service area is set around each of the base stations. Communication apparatus (radio telephone apparatus, i.e., subscriber stations) in each of the service areas communicate with the base station in the area and set a telephone circuit via the base station to make a telephone call to an optional party and to carry out data transmission.

In this case, the general radio telephone apparatus incorporates a secondary battery therein and operates by using the secondary battery as a power source.

A comparatively small radio communication apparatus such as a portable telephone or the like has a display unit such as a comparatively small-sized liquid crystal display panel or the like which displays various information in the form of letters, numerals and symbols. Information displayed on this display unit includes, for example, a telephone number for calling, a registered telephone number, date and time, a reception level, a remaining charge amount of the secondary battery, and so on.

If more information can be displayed on the display unit, it becomes more convenient in view of use of the radio communication apparatus to that extent. However, an area of the display panel is limited due to a demand for miniaturization of the radio communication apparatus and hence limited information are displayed by using comparatively small letters and symbols. FIG. 1 is a diagram showing an example of a display panel of a portable telephone. A display panel 90 shown in FIG. 1 has a display area 91 used for displaying letters "圈外" (this means "out of area" in English) which means that the portable telephone is positioned out of a telephone call area (out of service area), a reception-level display area 92 used for displaying a reception level of a signal from a base station in the form of a bar graph including a plurality of bars (three bars in an example shown in FIG. 1) as well as a symbol of an antenna, and a battery-remaining-amount display area 93 used for displaying a remaining charge amount of a secondary battery by using the number of display blocks in a figure representing a battery. The display panel has at the remaining portion a plurality of areas 94 used for displaying numerics and letters, the plurality of the areas 94 are arranged in a dot matrix fashion with predetermined columns and rows (in this case, letters of ten columns×three rows, i.e., thirty letters). In the area 94 where a plurality of dot matrixes are provided, numerics such as a telephone number or the like, a registered name, various messages etc. are displayed.

Since the display panel thus arranged has a dimension of a lateral length of about 2 to 3 cm and a longitudinal length of about 1 to 2 cm, representation of the remaining charged amount of the secondary battery is displayed with extremely small symbols, which makes very difficult for a user to see what is displayed. In particular, if larger display areas formed of dot matrixes for letters and numerics are secured on the display panel, the symbol display area becomes smaller, which makes it extremely difficult for a user to see what is displayed.

While a display panel of a portable telephone has been described by way of example, display panels of various electronic equipments are also encountered by the same problems when a state of an electronic equipment is displayed.

SUMMARY OF THE INVENTION

In view of such aspects, it is an object of the present invention to satisfactorily display a state of an electronic equipment on an electronic equipment such as a communication apparatus.

According to the first aspect of the present invention, a display method of displaying a state of an electronic equipment includes a step of displaying at least two states of the electronic equipment by using change among representations of face portions that are different from one another.

According to the second aspect of the present invention, an electronic equipment for displaying a state of an operation and a status includes a detection unit for detecting at least two states of the electronic equipment, and a display unit for displaying the at least two states obtained from an output from the detection unit by using change among representations of face portions different from one another.

According to a third aspect of the present invention, a communication apparatus for displaying a state of an operation and a status thereof includes a detection unit for detecting at least two states of the electronic equipment, and a display unit for displaying the at least two states obtained from an output from the detection unit by using change among representations of face portions different from one another.

BRIEF DESCRIPTION OF THE DRAWINGS

FIGS. 12A to 12D are diagrams used to explain an example or displaying a rotated figure according to the embodiment of the present invention and parts used therefor;

FIG. 15 is a diagram showing a modified example of the representation (having a different dot arrangement) according to the embodiment of the present invention; and FIG. 16 is a diagram showing a modified example of the representation (having a different dot arrangement) according to the embodiment of the present invention.

DESCRIPTION OF THE PREFERRED EMBODIMENT

An embodiment of the present invention will hereinafter be described with reference to FIGS. 2 to 16.

Figure 2:
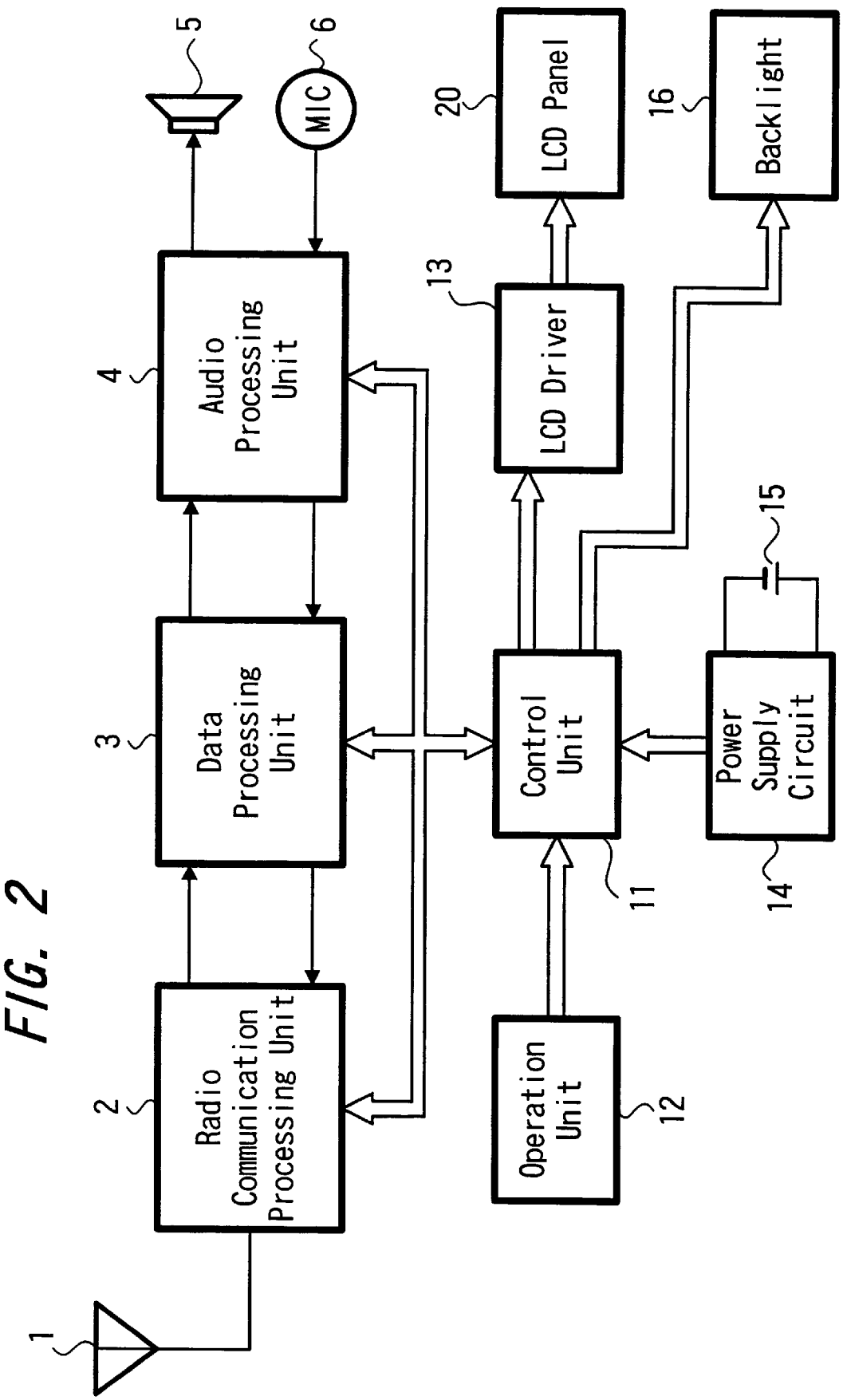
FIG. 2 is a block diagram showing an arrangement of a terminal apparatus to which an embodiment of the present invention is applied.

In this embodiment, the present invention is applied to a terminal apparatus of a radio telephone system. The radio telephone system to which the present invention is applied may be not only a general radio telephone but also a simple type radio telephone system such as a personal handy phone (PHS) or the like, and in each of the systems a basic arrangement is the same. FIG. 2 is a block diagram showing an arrangement of the terminal apparatus. The terminal apparatus has an antenna 1 used for communicating with a base station by wireless communication and connected to a radio communication processing unit 2. A transmission signal subjected by the radio communication processing unit 2 to a transmission processing is transmitted from the antenna 1 by wireless communication, and a signal having a predetermined frequency band and transmitted from the base station is received by the antenna 1 and then subjected to a reception processing by the radio communication processing unit 2 to obtain a reception signal.

The reception signal subjected to the reception processing by the radio communication processing unit 2 and thereby demodulated is supplied to a data processing unit 3. The data processing unit 3 subjects the supplied reception signal to a predetermined data processing to extract audio data and control data. The audio data extracted by the data processing unit is supplied to an audio processing unit 4. The audio processing unit 4 subjects the supplied audio data to an audio processing such as a digital-to-analog conversion, amplification or the like and supplies the processed audio signal to a speaker 5. The speaker 5 emanates a sound.

An audio signal obtained from a sound the microphone 6 picks up is supplied to the audio processing unit 4. The audio processing unit 4 carries out the audio processing such as an analog-to-digital conversion or the like to obtain transmission audio data and supplies the audio data to the data processing unit 3. The data processing unit 3 adds the supplied audio data with other data such as a control data, synchronization data or the like to form a transmission signal, and supplies the transmission signal to the radio communication processing unit 2. The radio communication processing unit 2 modulates the supplied transmission signal and then frequency-converts the modulated signal into a signal having a predetermined transmission frequency, thereafter the frequency-converted transmission signal being transmitted from the antenna 1 by wireless communication.

The above reception and transmission processings are carried out under the control of a control unit 11 as a system controller of the terminal apparatus. In this case, information about operations of respective operation units 12 such as a dial key or the like provided in the terminal apparatus are supplied to the control unit 11. The control unit 11 carries out various kind of processings of the radio telephone such as a call-out processing, a call-in processing or the like based on the operation information. The control unit 11 supplies a display control signal to a liquid crystal display (LCD) driver 13 serving as a drive circuit for a liquid crystal display panel. A liquid crystal display panel 20 connected to the LCD driver 13 displays letters, numerics, figures and so on based on the display control signal.

A backlight 16 is provided on a surface on the opposite side of a display surface of the liquid crystal display panel 20. The backlight 16 is turned on at a predetermined time under the control of the control unit 11 to illuminate the liquid crystal display panel 20. A backlight incorporating light emitting diodes having a plurality of colors is employed as the backlight 16 of this embodiment. For example, a red light emitting diode and a green light emitting diode are incorporated in the backlight 16 and the light emitting diodes of respective colors can individually emit light to illuminate the liquid crystal display panel 20 with red or green light and can emit both lights simultaneously to illuminate it with yellow light. Control of colors of emitted light is carried out under the control of the control unit 11.

A secondary battery 15 as a power source for operating the terminal apparatus according to this embodiment is incorporated in (or externally attached to) the terminal apparatus. A power source circuit 14 connected to the secondary battery 15 supplies to each of the circuits in the terminal apparatus a power source corresponding to a voltage of each circuit. In this case, the power source circuit 14 is arranged so as to detect a battery state of the secondary battery 15 such as a remaining charged amount or the like based on a battery voltage, a current and so on, and supplies information about the detected battery state such as the remaining charged amount or the like to the control unit 11.

Under the control of the control unit 11, the liquid crystal display panel 20 displays thereon not only representations directly concerning a telephone call such as a telephone number of call-out and call-in, a name corresponding to a registered telephone number and so on but also a service level representation indicating that the terminal apparatus is located within a service area, representation of the remaining charged amount of the secondary battery 15 and etc.

When the control unit 11 determines a reception electric field intensity of a specific signal transmitted from a base station and determines that the terminal apparatus is located out of a service area, representation indicating that the terminal apparatus is out of an area. Contrary, when the control unit 11 determines that the terminal apparatus is located within a service area, one of plural-step representations is carried out depending upon an intensity of the level based on the received electric field intensity. Thus, the service level representations carried out. The plural-step representation of the remaining charged amount is also carried out based on the remaining charged amount of the secondary battery 15 determined by the control unit 11.

Figure 3:
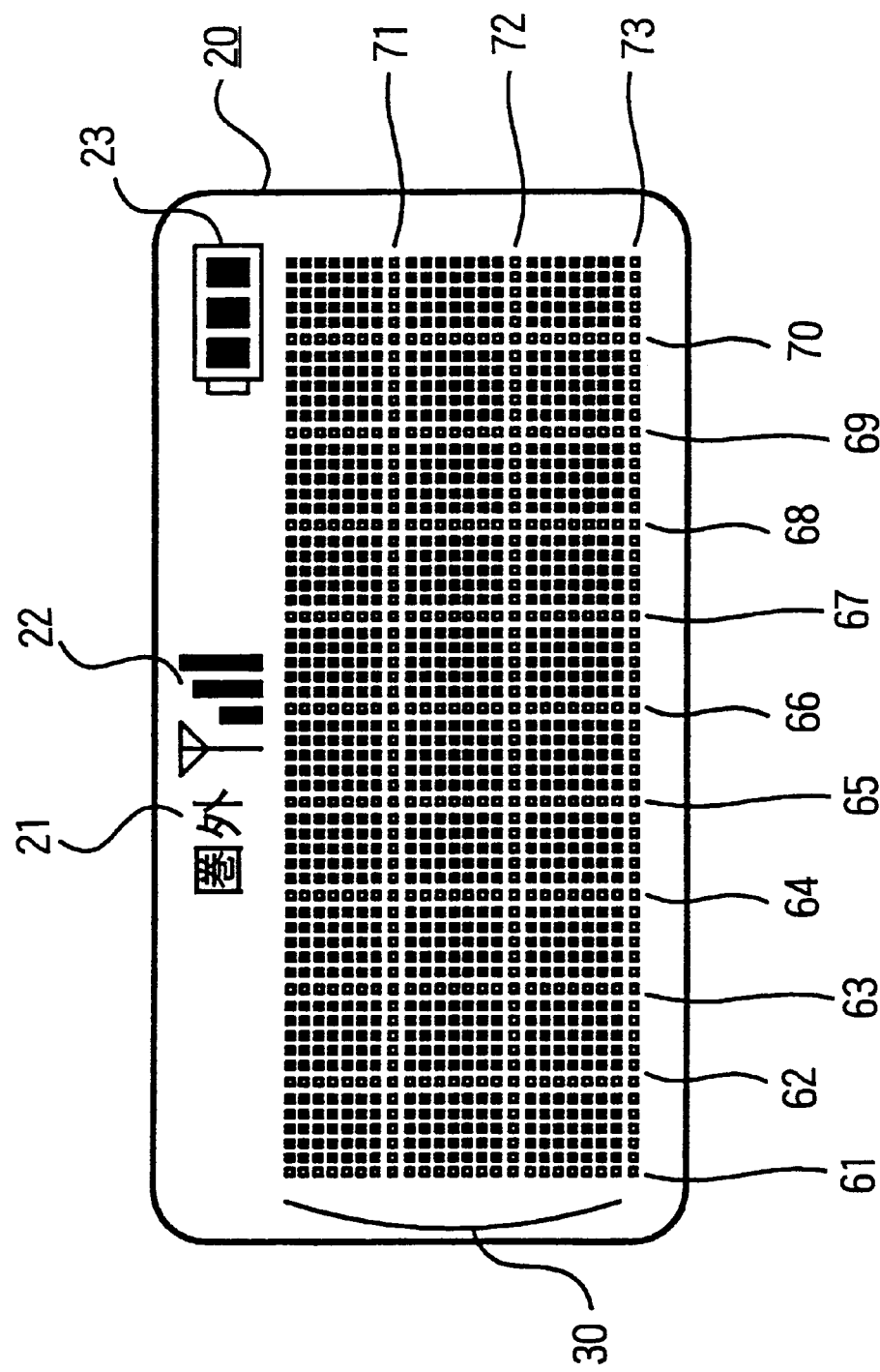
FIG. 3 is a plan view showing an arrangement of a display panel according to the embodiment of the present invention.

FIG. 3 is a diagram showing an arrangement of the liquid crystal display panel 20 according to this embodiment. The liquid crystal display panel 20 has, at its upper portion, an area 21 used for displaying letters "圈外" which means that the terminal apparatus is located out of a telephone call area (i.e., a service area, a service level display area 22 used of displaying a symbol of an antenna and a reception level of a signal from a base station in the form of a graph using a plurality of bars (three bars in this embodiment), a remaining-charged-amount display area 23 used for displaying a remaining charged amount of the secondary battery 15 by using the number of display blocks in the figure representing a battery. When the service level representation is displayed in the display area 22, if a state of the reception level in the service area is the worst state, then only a figure representing an antenna is displayed. Four-step representation is carried out in such a manner that as the reception level becomes better step by step from that state, the number of the bars in the bar graph is increased. When the remaining charged amount is displayed in the display area 23, three-step representation is carried out in which the number of displayed three blocks is increased or decreased depending upon the remaining charged amount.

The liquid crystal display panel 20 has, at a rest portion, an area 30 used for displaying numerics and letters by using a dot matrix. The area 30 is provided so as to display letters of predetermined columns and rows (ten columns and three rows in this embodiment). On this display area 30 using the dot matrixes, numerics such as a telephone number, a registered name, various messages and so on are displayed.

In this embodiment, in the dot-matrix display area 30, other than the letters and numerics, the service level representation and the remaining charged amount representation are carried out by using a figure of a deformed face. Detailed representation of a figure of a deformed face will be described later on. In order to display the figure of the deformed face, this dot-matrix display area 30 has added lines 61 to 73 provided between the display areas for the letters, and hence can display a comparatively large figure by using the entire dot-matrix display area 30.

Figure 4:
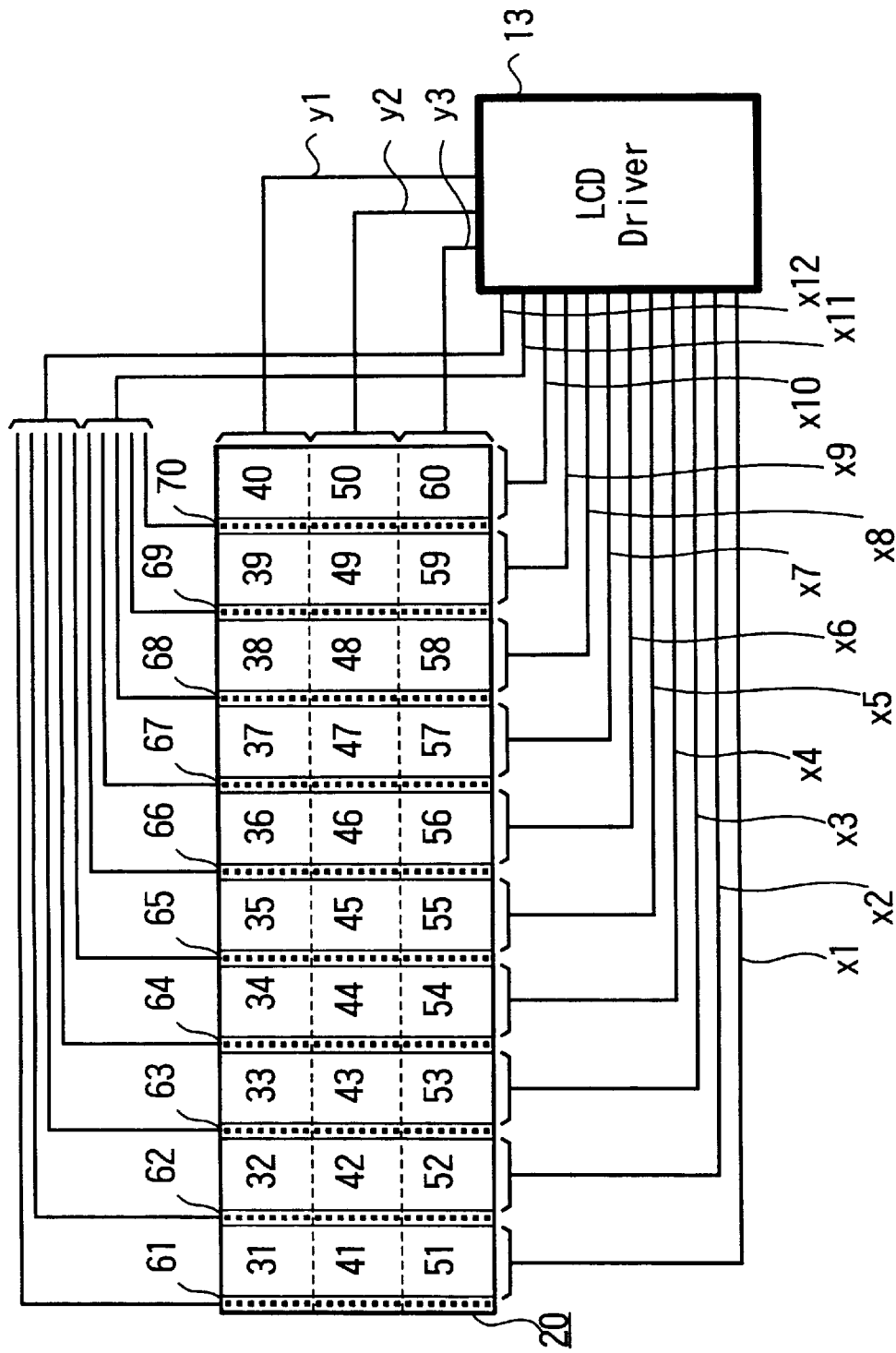
FIG. 4 is a diagram used to explain a connection state of the display panel and a driver according to the embodiment of the present invention.

Specifically, the dot-matrix area 30 according to this embodiment is formed of thirty letter display areas of ten columns×three rows (letter display areas 31, 32, 33, . . . , 60 shown in FIG. 4). One letter display area is formed of 35 dots of 7-dot column×5-dot row. As shown in FIG. 3, dots shown by solid squares are dots forming each of the letter display areas. In this embodiment, the added vertical lines 61 to 70 are provided at vertical-direction spaces between the adjacent letter display areas and at the left end of the dot-matrix display area 30. The added horizontal lines 71, 72, 73 used for displaying cursors. In FIG. 3, dots shown by open squares are dots forming each of the added lines.

FIG. 4 is a diagram showing a connection state of the dot-matrix display area 30 of the liquid display panel 20 and the LCD driver 13. A LCD driver which can display a dot matrix of ten columns×three rows the LCD driver 13 according to this embodiment. As shown in FIG. 4, the dot-matrix display area 30 is formed of the thirty letter display areas 31, 32, 33, . . . , 60 of ten columns×three rows in vertical lines (5 dots×10: 50 lines) of dots forming the ten letter display areas of each row are connected to the LCD driver 13 by using vertical line connection unit X1 to X10 for twelve columns of prepared vertical line connection units X1 to X12 of the LCD driver 13. Horizontal lines (7 dots×3+3 dots for the cursor display lines: 24 lines) are connected to the LCD driver 13 by using the horizontal line connection units Y1, Y2, Y3 prepared for three rows.

Ten lines forming the added vertical lines 61 to 70 are connected to the LCD driver 13 by using ten line amount of the remaining vertical line connection units X11, X12 for two columns of the LCD driver 13. In this case, the LCD driver 13 which can display 8 dots including one dot for the cursor display line in the vertical direction is employed (if a driver which can display only 7 dots in the vertical direction, then another horizontal line connection unit is used as used for the added vertical lines).

As shown in FIG. 3, this arrangement permits an area of 24 vertical direction dots×60 horizontal direction dots continuously provided to be formed. Use of this area 30 permits not only the display of letters and numerics with an area of ten columns×three rows (when only the letters and numerics are displayed, the added lines 61 to 73 are not used) but also a figure and etc. continuously employing the dot-matrix display area 30 is employed.

Figure 1:
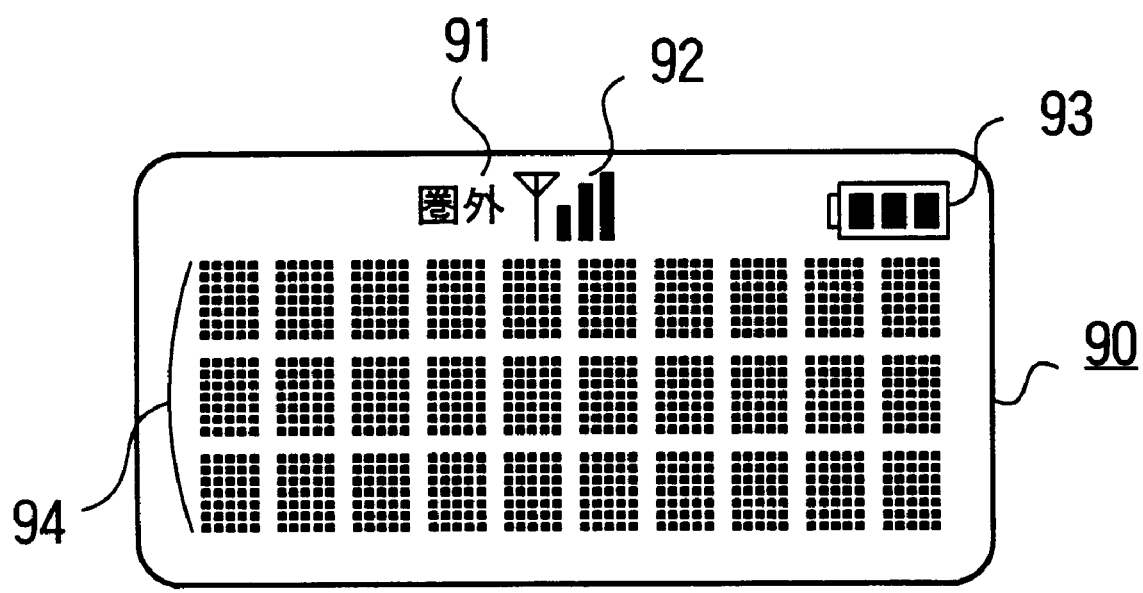
FIG. 1 is a diagram used to explain an example of a display panel of a portable telephone.
Figure 5:
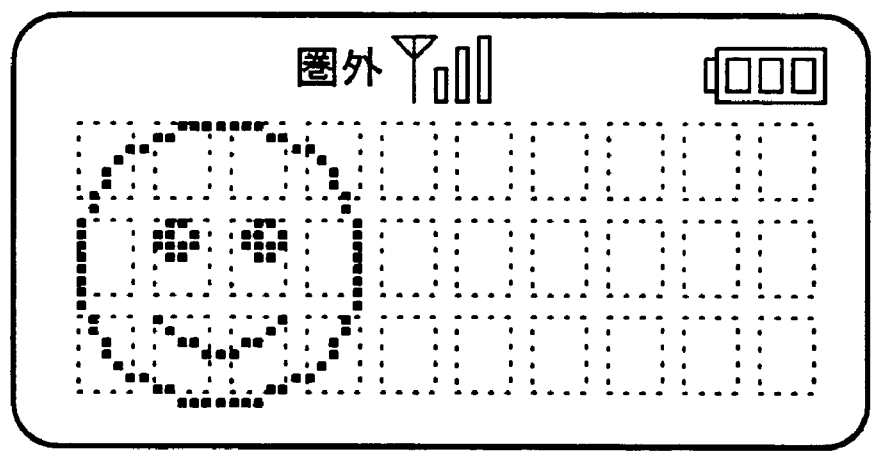
FIG. 5 is a plan view showing a display example according to the embodiment of the present invention.
Figure 6:
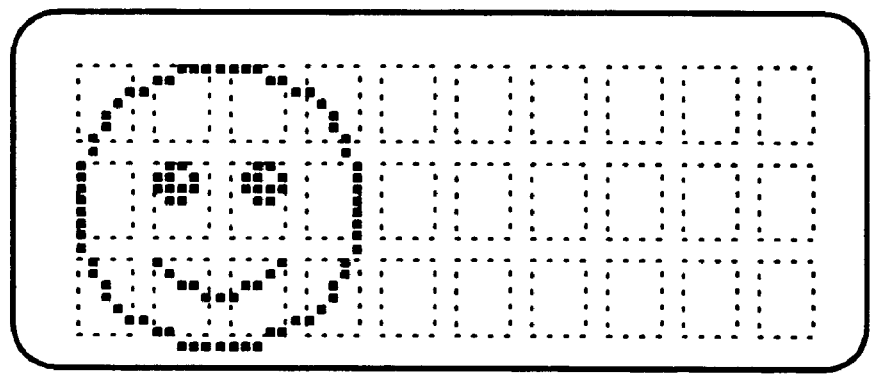
FIG. 6 is a plan view showing a display example (in which another symbols are not displayed on a panel) according to the embodiment of the present invention.

A processing for displaying a figure and so on by using the dot-matrix display area 30 according to this embodiment will be described. It is assumed that under the control of the control unit 11, a figure of a face representing two states of a service level and a battery remaining amount is displayed on the dot-matrix display area 30 of the liquid crystal display panel 20. Specifically, based on the service level and the battery remaining amount determined by the control unit 11, the control unit 11 supplies a display control signal used for display the figure of the corresponding face to the LCD driver 13. As shown in FIG. 5, the figure of the corresponding face is displayed at the left end of the dot-matrix display area 30. In the case shown in FIG. 5, the representation indicative of a "out-of-area" state, a service level representation and a remaining charged amount representation are carried out on the display areas 21, 22, 23 on an upper portion of the liquid crystal display panel 20 similarly to that shown in FIG. 1 (while all representations are displayed in FIG. 5, practically only a portion corresponding to a state is displayed). Alternatively, as shown in FIG. 6, only the dot-matrix display area 30 as the liquid crystal display panel 20 may be prepared to display only the figure corresponding to the service level and the battery remaining amount on the dot-matrix display area 30.

Figure 7:
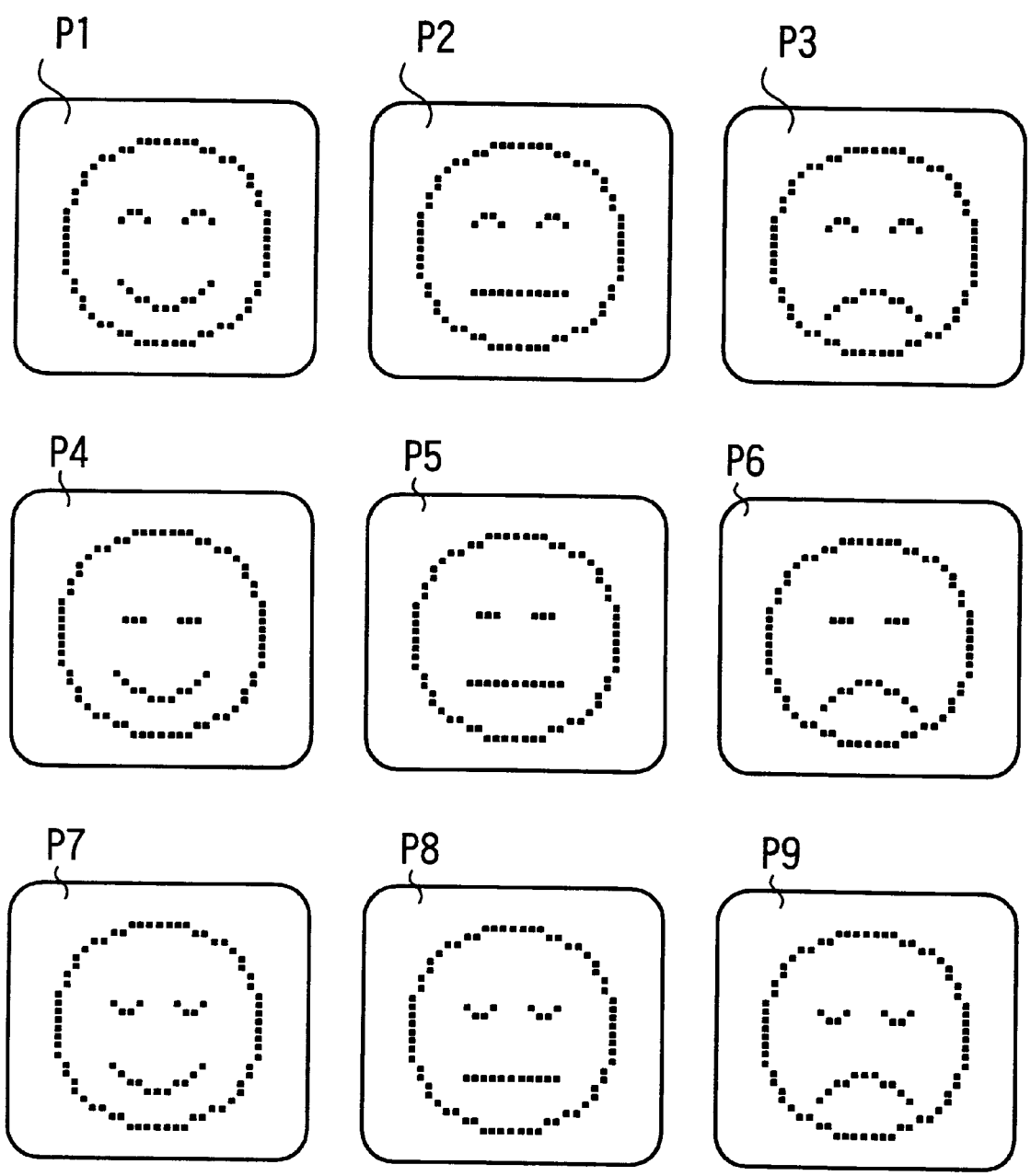
FIG. 7 is a diagram used to explain a changed state of a representation according to the embodiment of the present invention.

FIG. 7 is a diagram showing a changed state of the figure of the displayed face in this embodiment. The figures of faces having expressions of nine kinds are previously prepared, and one of the figures of the faces of the expressions is displayed in response to the service level and the battery remaining amount. Specifically, the control unit 11 determines the service level by using three steps: a strong electric field state, a weak electric field state, and an out-of-area state. Control unit 11 also determines the battery remaining amount by using three steps of large remaining amount, a middle remaining amount and a small remaining amount. The control 11 practically determines the states by using finer steps and displays the states determined as ones of the fine steps on the display areas 21, 22, 23.

When the expression is changed in the figure of the displayed face, eyes of the displayed face in the figure are changed in response to the determined service level and mouths of the displayed face are changed in response to the determined battery remaining amount. Specifically, when the expression of the eyes is changed in response to the service level, the eyes of the laughing face (eyes formed of upward semicircles) are displayed in case of the strong electric field state. The eyes of a normal expression (linear-shaped eyes) are displayed in case of the weak electric field state. The closed eyes (eyes formed of downward semicircles) are displayed in case of the out-of-area state. When the expression of the mouths is changed in response to the battery remaining amount, the mouths of the laughing face (mouths formed of upward semicircles) are displayed in case of the large remaining amount state. The mouths of a normal expression (linear-shaped mouths) are displayed in case of the middle remaining amount state. The closed mouths (mouths formed of downward semicircles) are displayed in case of the small remaining amount state.

Combination of the eye expressions of three kinds and the mouth expressions of three kinds permits figures P1 to P9 of face expressions of nine kinds shown in FIG. 7 to be formed, and one of the nine figures is selected in response to the service level and the battery remaining amount of the terminal apparatus at that time and then displayed on the dot-matrix display area 30 of the liquid crystal display panel 20. For example, the figure P1 indicates a strong electric field and a large battery remaining amount. The figure P2 indicates a strong electric field and a middle battery remaining amount. The figure P3 indicates a strong electric field and a small battery remaining amount. The figure P4 indicates a weak electric field and a large battery remaining amount. The figure P5 indicates a weak electric field and a middle battery remaining amount. The figure P6 indicates a weal electric field and a small battery remaining amount. The figure P7 indicates a out-of-area state and a strong battery remaining amount. The figure P8 indicates a out-of-area state and a middle battery remaining amount. The figure P9 indicates a out-of-area state and a small battery remaining amount.

Figures 8A, 8B, 8C, 8D:
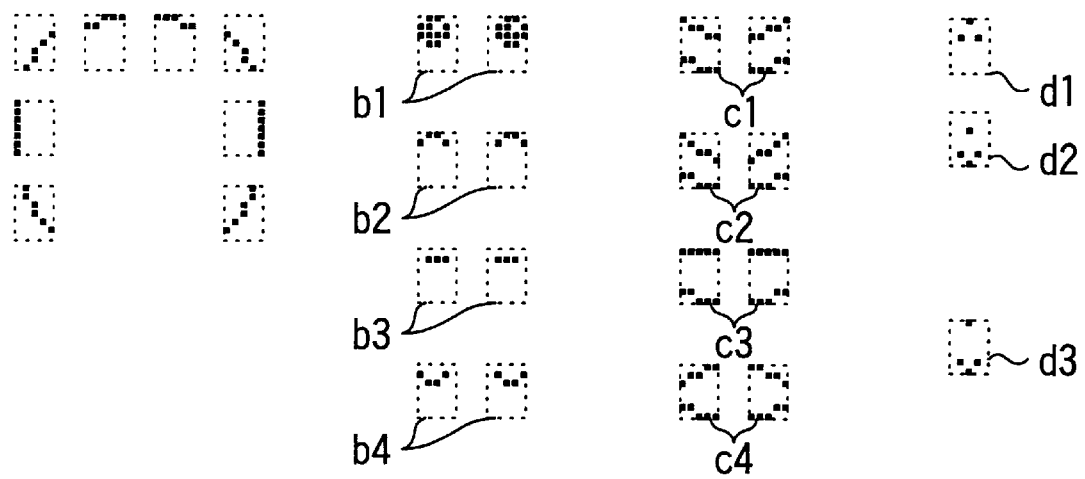
FIGS. 8A to 8D are diagrams used to explain display parts according to the embodiment of the present invention.

Each of the figures of faces of expressions is formed by combination of parts each formed of a divided letter display area of eight vertical-direction dots×five horizontal-direction dots. FIGS. 8A to 8D are diagrams showing the display parts. Parts of a contour portion shown in FIG. 8A are commonly used in faces of respective expressions. One of parts b1, b2, b3, b4 of eyes shown in FIG. 8B is selected depending upon the expression. The parts b1 is used to display largely opened eyes and different from parts used to display the above three expressions. A case employing the parts b1 will be described later on.

One of parts c1, c2, c3, c4 of mouths shown in FIG. 8C is selected depending upon the expression. The parts c1 is used to display a largely opened mouth and different from parts used to display the above three expressions. A case employing the parts b1 will be described later on.

Parts d1, d2, d3 of a space portion shown in FIG. 8D are obtained by converting parts used for display on the added lines into parts having a size of eight vertical-direction dots×five horizontal-direction dots similar to that of the letter display area. One of the parts d1, d2, d3 is selected properly in response to a shape of the figure to be displayed at the time.

Thus, it is possible to display the figures of the faces having nine kinds of expressions only by preparing plural kinds of parts corresponding to eyes, a mouth and a space portion and selecting properly some parts therefrom.

In this embodiment, the figures of the faces of nine kinds of expressions are displayed on the liquid display panel 20 to display a current state of the terminal apparatus (the service level and the battery remaining amount), and in response to the displayed figure, the color of light used for display is changed by the backlight 16 provided on the rear surface side of the liquid crystal display panel 20. Specifically, the backlight 16 according to this embodiment provides three illumination colors of red, green and yellow for selection. For example, the liquid crystal display panel 20 is illuminated with green light when the state of the terminal apparatus is comparatively satisfactory. The liquid crystal display panel 20 is illuminated with yellow light when the state of the terminal apparatus is comparatively unsatisfactory. The liquid crystal display panel 20 is illuminated with red light when the state of the terminal apparatus is considerably unsatisfactory.

Specifically, light of color used when the figures of the nine kinds of expressions shown in FIG. 7 will be described. When the figure P1 indicative of a strong electric field and a large battery remaining amount is displayed, the backlight 16 employs the green light illumination. When the figure P9 indicative of an out-of-area state and a small battery remaining amount is displayed, the backlight 16 employs a red light illumination. When the figures P2 to P8 indicative of other states are displayed, the backlight 16 employs a yellow light illumination.

Alternatively, the following example of allocating colors to the states of the terminal apparatus may be employed. Specifically, when the figure P1 indicative of a strong electric field and a large battery remaining amount is displayed, the backlight 16 employs the green light illumination. When the figures P2, P4, P5 indicating a state that at least either of the states becomes worse by one step from the state of the figure P1 are displayed, the backlight 16 employs a yellow light illumination. When the figures P3, P6, P7, P8, P9 indicative of a state that at least one of the states is the worst state are displayed, the backlight 16 employs a red light illumination.

Alternatively, the illumination color of the backlight 16 may be changed in response only to one of the two states. For example, when the figures P1 to P3 indicating that the service level is a strong electric field are displayed, the backlight 16 employs a green light illumination. When the figures P4 to P6 indicating that the service level is a weak electric field are displayed, the backlight 16 employs a yellow light illumination. When the figures P7 to P9 indicating that the service level is an out-of-area state are displayed, the backlight 16 employs a red light illumination. Contrary, the illumination color of the backlight 16 may be changed in response only to the change of the battery remaining amount. Moreover, another example of allocating the illumination colors to the changed states may be set.

Figure 9:
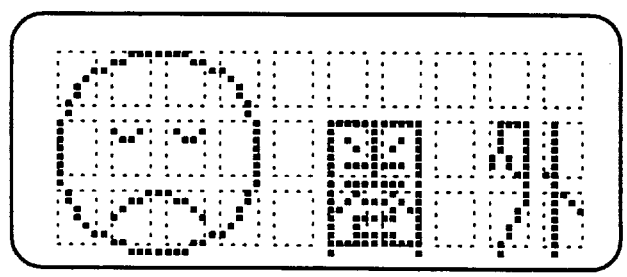
FIG. 9 is a plan view showing a display example (in which a representation is displayed together with letters) according to the embodiment of the present invention.

When the figures of the faces described above are displayed on the dot-matrix display area 30 of the liquid crystal display panel 20, another representation may be carried out on a remaining portion of the dot-matrix display area 30. For example, as shown in FIG. 9, when the figure P9 indicative of the out-of-area state is displayed at the left end of the dot-matrix display area 30, letters "圏外" (which are chinese characters) may be displayed on a right-hand remaining portion of the dot-matrix display portion 30. In this case, since the dot-matrix display area 30 is an area where dots are continuously disposed, the letters can be satisfactorily displayed by using a plurality of letter display areas continuously. Even in other states, letters and so on may be displayed together with the figure indicative of the state. Moreover, other information such as a telephone number or the like may be simultaneously displayed.

Figure 10A:
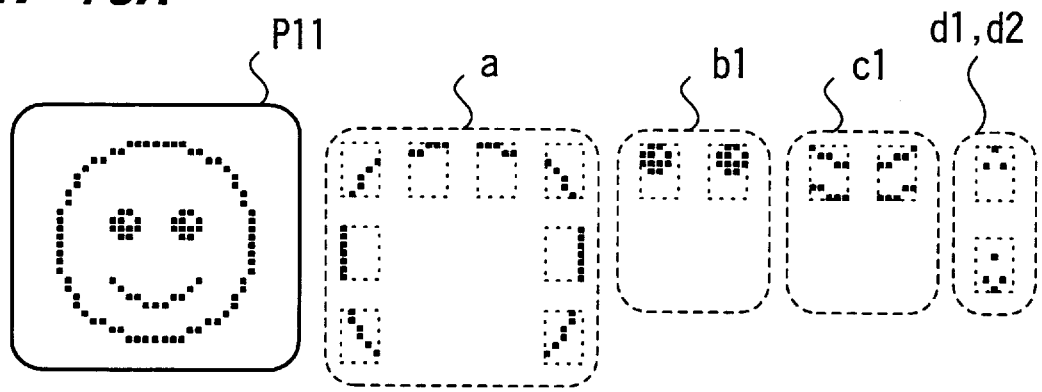
FIGS. 10A to 10C are diagrams used to explain an example of displaying a moving representation according to the embodiment of the present invention and parts used therefor.
Figure 10B:
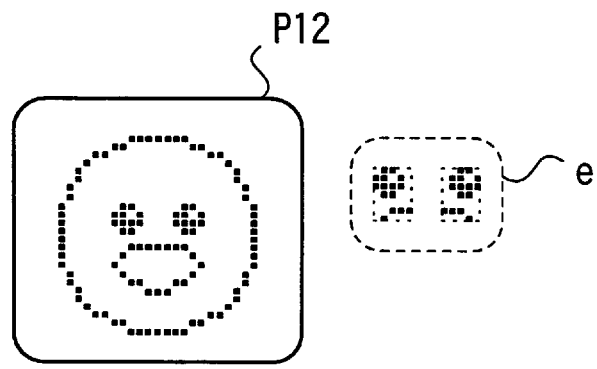
Figure 10C:
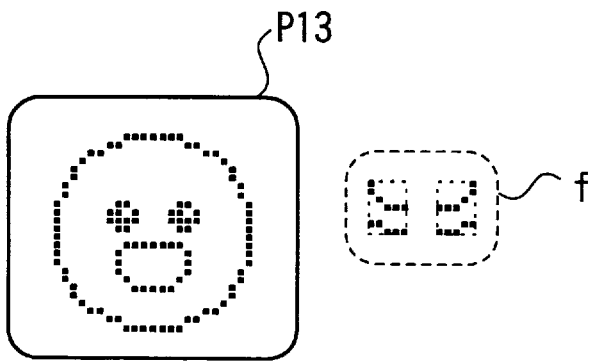
Figure 11:
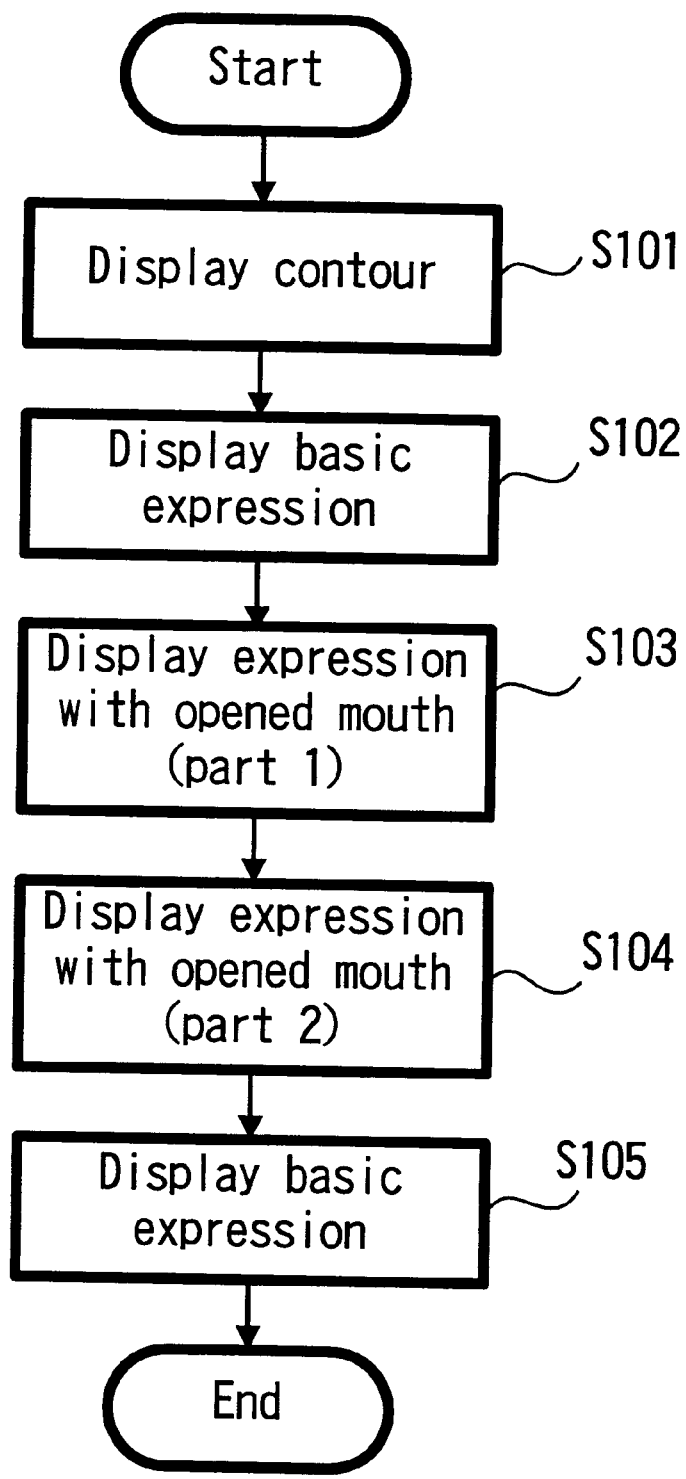
FIG. 11 is a flowchart showing a display processing for opening and closing a mouth of a face of the representation according to the embodiment of the present invention.
Figure 13:
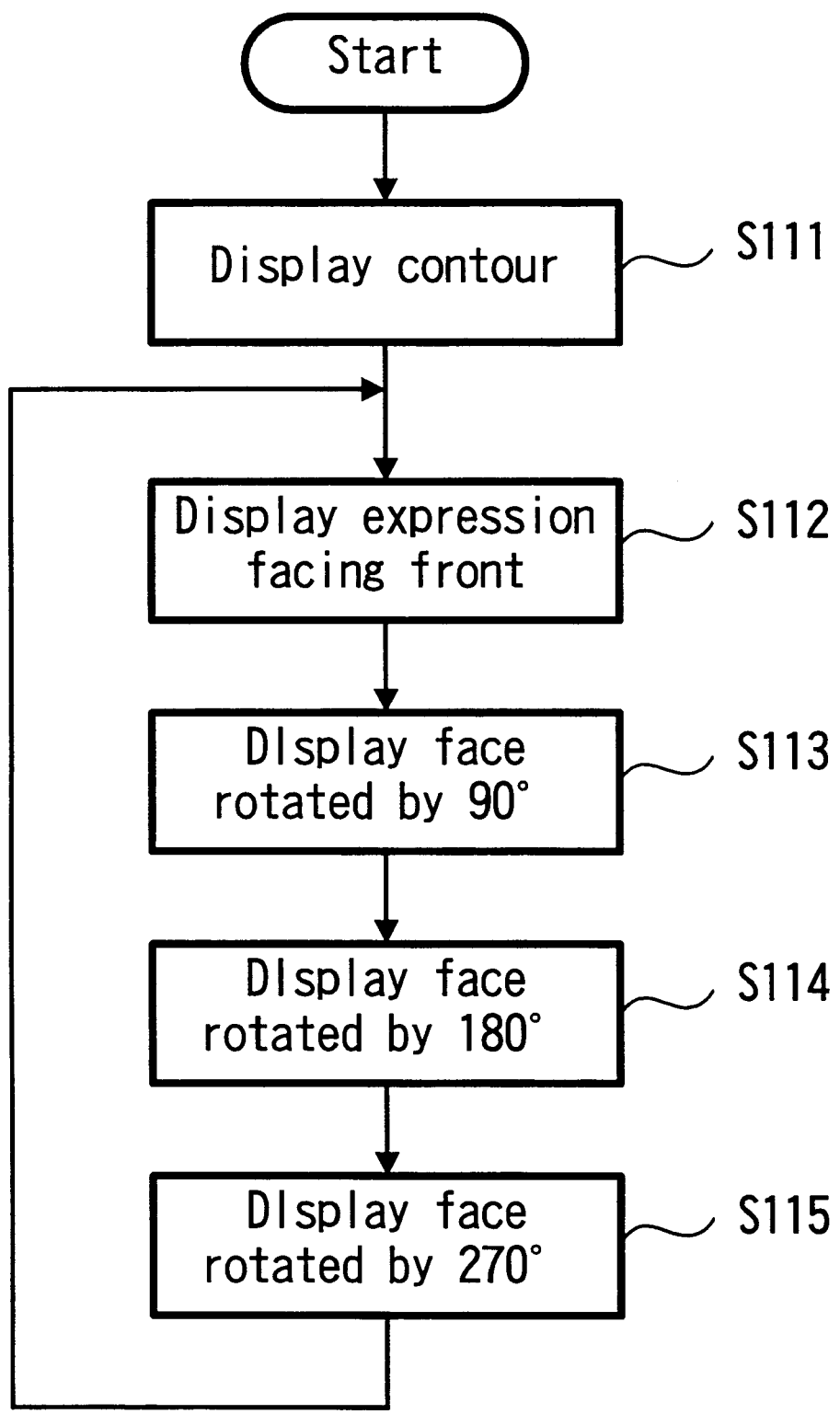
FIG. 13 is a flowchart showing a rotation display processing according to the embodiment of the present invention.
Figure 14A:
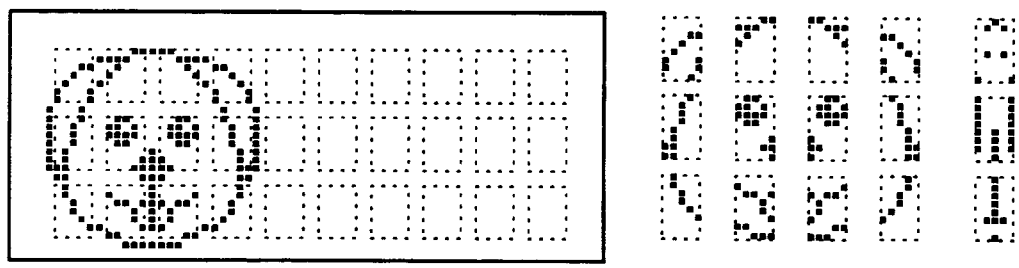
FIGS. 14A to 14D are diagrams used to explain a modified example of the representation (employing a dog's face) according to the embodiment of the present invention.
Figure 14B:
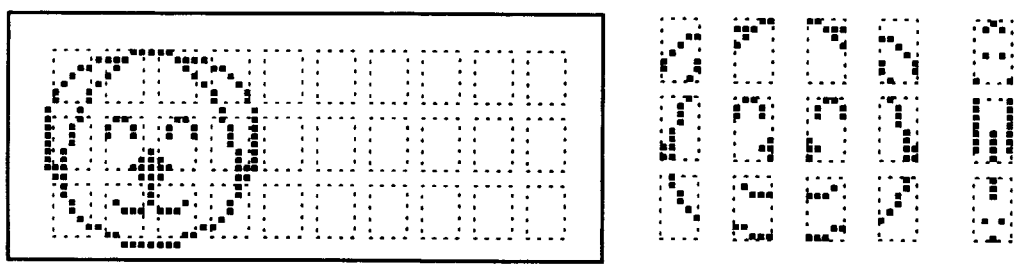
Figure 14C:
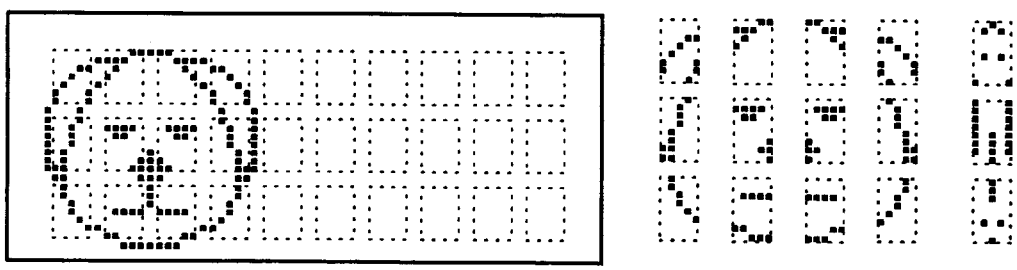
Figure 14D:
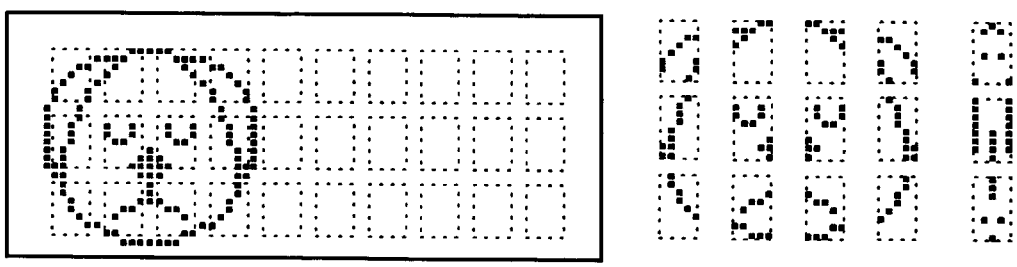

In the terminal apparatus of this embodiment, when any alarm sound or a message is desired under the control of the control unit 11, as time passes, the displayed face portion may be changed in the figure of the faces displayed on the dot-matrix display area 30 of the liquid crystal display panel 20. For example, as shown in FIGS. 10A to 10C, the displayed figure of the face presenting a state that the mouth thereof is being opened and closed may be displayed. Specifically, as shown in FIG. 11 which is a flowchart therefor, a contour of the face is constantly displayed by using parts forming the contour portion of the face in step S101. Further, a basic expression is displayed by using parts indicative of the closed mouth in step S102. The figure P11 shown in FIG. 10A is a figure of a face of the basic expression and employs contour portion parts, the parts b1 for eyes, the parts c1 for the mouth, and the parts d1, d2 for the space portions.

When a predetermined time (e.g., one second) passes after the display of the basic expression, a figure P12 shown in FIG. 10B and indicative of a face with an opened mouth (part 1) is displayed by using parts indicative of a state with an opened mouth in step S103. In this case, parts for an upper lip portion used in the basic expression is changed to the parts e, thereby the face with the opened mouth being displayed.

When a predetermined time (e.g., one second) after the display of the face with opened mouth (part 1), a figure P13 shown in FIG. 10C and indicative of a face with an opened mouth (part 2) is displayed by using parts indicative of a state with an opened mouth in step S104. In this case, parts for an upper lip portion used in the basic expression is changed to the parts f, thereby the face with the opened mouth being displayed.

When a predetermined time (e.g., one second) after the display of the face with opened mouth (part 2), the figure P11 shown in FIG. 10A and indicative of the face with the closed mouth is displayed by using parts indicative of a state with an opened mouth in step S105.

The above processing permits the face with the opened mouth to be displayed once, and hence, if necessity is caused, a representation indicating that the mouth is successively opened and closed is displayed by repeatedly carrying out the processing according to the flowchart shown in FIG. 11.

In the terminal apparatus of this embodiment, when some operation (operation of a jog dial which a user rotates to carry out an input operation) is carried out by using the operation unit 12 or when there is a waiting time until a called party answers upon call-out, the figure of the face displayed on the dot-matrix display area of the liquid crystal display area 30 is rotated and then displayed thereon.

FIGS. 12A to 12D are diagrams showing an example of a display presented when the figure is rotated. Figures of the faces used for the display of the rotated figures includes a figure P21 shown in FIG. 12A indicative of the face positioned to the front and rotated by a rotation angle of 0°, a figure P22 shown in FIG. 12B rotated by a rotation angle of 90°, a figure P23 shown in FIG. 12C rotated by a rotation angle of 180°, and a figure P24 shown in FIG. 12D rotated by a rotation angle of 270°. Each of these figures P21 to P24 is formed of the parts all for the common contour portion used for forming a contour of a face, and further formed of one of the parts b11, b12, b13, b14 for the center portion and one of the parts d11, d12, d13, d14 for the space portion both of which are selected in response to the figure.

FIG. 12 is a flowchart used to explain a processing for displaying the rotated figure. In step S111, a contour display processing using the parts for forming the contour portion is constantly carried out. Then, in step S112, the figure P21 indicative of the face positioned to the front is displayed by using the parts b11 for the center portion and the parts d11 for the space portion. When a predetermined time passes after the display of the figure P21 indicative of the face positioned to the front, the figure P22 rotated by 90° is displayed by using the parts b12 for the center portion and the parts d12 for the space portion in step S113. When a predetermined time passes after the display of the figure P22 rotated by 90°, the figure P23 rotated by 180° is displayed by using the parts b13 for the center portion and the parts d13 for the space portion in step S114. When a predetermined time passes after the display of the figure P23 rotated by 180°, the figure P24 rotated by 270° is displayed by using the parts b14 for the center portion and the parts d14 for the space portion in step S115. When a predetermined time passes after the display of the figure P24 rotated by 270°, the figure P21 formed in step S112 is displayed again. Hereinafter, while the rotation of the figure is required, the display processing is repeatedly carried out in accordance with the flowchart shown in FIG. 13.

While in the flowchart shown in FIG. 12 an example of rotating the figure in only one direction is described, the present invention is not limited thereto. The figure may be rotated in both of the above direction and the reverse direction, e.g., the rotation direction of the figure of the face corresponding to the operation direction (rotation direction) of the operation unit may be set. A period used for changing the rotation angle by 90° (e.g., a rotation speed of the displayed figure) may be set to a speed in proportion to the operation speed of the operation unit (e.g., a rotation speed of a jog dial), thereby the rotation speed being changed. Further, while in this embodiment the figure is rotated by changing the rotation angle by 90°, the figure may be changed by every finer angle.

While the face of one kind with the opened eyes and the mouth of the laughing face is rotated as the figure to be rotated, if the figures of the faces set in response to the state of the terminal apparatus shown in FIG. 7 is required to be rotated, they may be rotated by the above processing. This arrangement permits a user to simultaneously confirm the state of the terminal apparatus by watching the expression of the displayed face and the predetermined states (operation state, the standby state and so on) indicated by the rotation of the figure of the face.

While in this embodiment the deformed human face is employed as the figure of the displayed face, a figure of an animal or the like may be displayed. FIGS. 14A to 14D are diagrams showing the change of the expressions of dog's faces, showing each of the two states of the terminal apparatus by four steps (in FIGS. 14A to 14D, although only four examples are shown, there are figures of expressions of total sixteen kinds because each of the examples is changed at four steps). At the right-hand sides of FIGS. 14A to 14D, exploded parts forming the figures are shown.

In the examples shown in FIGS. 14A to 14D, the service level representation is displayed by using the expressions of the dogs' eyes and the representation of the battery remaining amount is displayed by using the expression of the dog's mouth. One expression of the dog's face can also display the two states of the terminal apparatus simultaneously similar to the above embodiment.

While in the respective examples described above the figure of the face is displayed on the liquid crystal display panel on which the letter representations each formed of five dots×eight dots are displayed in three rows, the figure of the face may be displayed on a display panel having another dot arrangement for displaying letters. For example, FIG. 15 is a diagram showing an example of displaying a figure of a face by using four fonts, each of which is formed of 12 vertical-direction dots×12 horizontal-direction dots, of a display panel. At the right-hand sides of FIG. 15, exploded parts forming the figure are shown.

FIG. 16 is a diagram showing an example of displaying a figure of a face by using four fonts, each of which is formed of 16 vertical-direction dots×16 horizontal-direction dots, of a display panel. At the right-hand sides of FIG. 16, exploded parts forming the figure are shown. As described above, if the shape of the face is properly set in response to the dot arrangement of the display panel to be used, then the display of the above figure can be carried out on a display panel having any dot arrangement.

While in the embodiment the illumination color of the backlight for illuminating the display unit is changed in response to the change of the state, the display unit may constantly be illuminated with light of one color. There may be no display-unit illumination means such as the backlight.

While in the embodiment the service level and the battery remaining amount of the terminal apparatus are displayed by using two parts of the figure of the one face, the two states may be indicated by using expression of one portion. Alternatively, more states may simultaneously be indicated by using three or larger parts of the face.

While in the embodiment the present invention is applied to the terminal apparatus of the radio telephone system and a simple type radio telephone system, it is needless to say that the present invention can be applied to a state display processing of a terminal apparatus of other communication system (e.g., any data transmission terminal apparatus) as long as the terminal apparatus is used in a communication system for communication via a base station.

The present invention can be applied to various electronic equipment other than such communication terminal apparatus when a plurality of states of the electronic equipment are displayed.

According to a display method of the present invention, it is possible to easily discriminate a plurality of states of an equipment based on an expression of a face shown in the displayed figure.

In this case, since a plurality of display areas each for displaying numerics and so on by using a dot matrix are continuously used to display a figure of a face, it is possible to easily display the figure of the face without preparing a display unit dedicated for the figure of the face.

In the above case, since the display color is changed in response to the change of the expression of the face, it is possible to display what the displayed face means more comprehensively.

In the above case, since the portion of the displayed face changed in response to the change of the state is changed as a time passes, it is possible to more effectively inform the state on the display by using the change of the face over time.

According to the display apparatus of the present invention, a signal used for displaying a figure of a face having changed expressions of different parts is generated based on an input information of at least two states of an electronic equipment and then the figure of the face is displayed on the display unit, it is possible for a user to determine a plurality of states of the electronic equipment from the figure of one face displayed on the display unit, and it is possible to easily determine a plurality of states of the electronic equipment from the displayed figure.

In this case, since the display unit has a plurality of display areas each for displaying numerics and so on by using a dot matrix which are continuously provided therein and the figure of the face is displayed by using the plurality of continuous display areas, without preparing a display unit dedicated for the figure of the face, by using general-purpose display areas formed of dot matrixes, it is possible to display the figure of the face.

In this case, since the backlight for illuminating the display unit with colors of plural kinds and the illumination color of the backlight is changed in response to the change of the expression of the face displayed on the display unit, it is possible to inform effectively the state by using the color of the backlight.

In this case, since the face portion displayed on the display unit is changed as time passes, it is possible to more effectively inform the display.

According to a communication apparatus of the present invention, the figure in which the expressions' different parts of the face are changed in response to the two states of the battery remaining charged amount and a radio communication state is displayed, it is possible for the user to understand at least the two states of the battery remaining charged amount and a radio communication state by watching the figure of the displayed face to thereby easily understand the state of the communication apparatus from the representation.

In this case, since the display unit has a plurality of display areas continuously provided for displaying numerics and etc. by using the dot matrixes and the figure of the face is displayed thereon by using the plurality of continuous display areas, without preparing the display unit dedicated for the figure of the face, it is possible to easily display the figure of the face by using the display area already provided in the apparatus for displaying numbers and names by using the dot matrixes.

In the above case, since the backlight for illuminating the display unit with light of colors of plural kinds is provided and the illumination color of the backlight is changed in response to the expression of the face, it becomes easier for the user to understand the changed expression of the face and to understand the remaining charged amount of the battery and the radio communication state from the displayed representation.

In the above case, since the portion of the face displayed on the display unit is changed as time passes, a time-series change of the face enables the state of the apparatus to be more effectively informed in the form of the displayed representation.

Moreover, in the above case, since the figure of the face displayed on the display unit is rotated when the control unit determines a predetermined operation or a predetermined state, it is possible for the user to understand the operation and the predetermined state from the displayed figure of the face.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A display method for displaying a state of an electronic equipment, comprising the steps of:

generating a facial image having a plurality of facial features, and associating said plurality of facial features with respective plurality of states of said electronic equipment;

informing a user of said electronic equipment of at least two states of said electronic equipment by changing representations of said plurality of facial features; and rotating said facial image in a clockwise direction when an operation of an operation unit is carried out in a first rotational direction and rotating said facial image in a counterclockwise direction when the operation of said operation unit is carried out in a second rotational direction opposite to said first direction, and said plurality of facial features indicate one of a first, a second and an intermediate level of each of said plurality of states of said electronic equipment.

2. The display method according to claim 1, wherein said step of informing includes using a plurality of display areas each having a dot matrix.

3. The display method according to claim 1, wherein said step of informing includes changing among display colors and changing among representations of said plurality of facial features.

4. The display method according to claim 1, wherein said step of informing includes changing said plurality of facial features as time passes.

5. The display method according to claim 3, wherein said step of changing among display colors includes changing colors of backlight.

6. The display method according to claim 1, further comprising providing said facial image as one of a simplified man, animal, robot, and virtual creature.

7. An electronic equipment including a system for displaying a state of operation and a status, the system comprising:

a detection unit for detecting at least two states of said electronic equipment;

a generating unit for generating a facial image having a plurality of facial features and for associating said plurality of facial features with respective plurality of states of said electronic equipment;

a display unit for displaying said at least two states obtained from an output from said detection unit by changing representations of said plurality of facial features to differentiate said states of said electronic equipment one from another; and an operation unit, wherein said display unit rotates said facial image in a clockwise direction when an operation of said operation unit is carried out in a first rotational direction and rotates said facial image in a counterclockwise direction when the operation of said operation unit is carried out in a second rotational direction opposite to said first direction, and said plurality of facial features indicate one of a first, a second and an intermediate level of each of said plurality of states of said electronic equipment.

8. The electronic equipment according to claim 7, wherein said display unit comprises a plurality of display areas each having a dot matrix.

9. The electronic equipment according to claim 7, further comprising means for changing among display colors and among representations of said plurality of facial features.

10. The electronic equipment according to claim 9, wherein said means for changing alters said plurality of facial features being displayed as time passes.

11. The electronic equipment according to claim 9, wherein said means for changing among display colors includes means for changing colors of a backlight.

12. The electronic equipment according to claim 7, wherein said facial image is one of a simplified man, animal, robot, and virtual creature.

13. The electronic equipment according to claim 7, wherein said detection unit includes means for detecting at least a state of a power source of said electronic equipment.

14. A communication apparatus for displaying a state of an operation and a status thereof of an electronic equipment, the apparatus comprising:

a detection unit for detecting at least two states of said electronic equipment;

a generating unit for generating a facial image having a plurality of facial features and for associating said plurality of facial features with respective plurality of states of said electronic equipment;

a display unit for displaying said at least two states obtained from an output from said detection unit by changing representations of said plurality of facial features for differentiating said states one from another;

an illumination unit for illuminating said display unit with one of red, yellow and green display colors, where each display color is associated with one of said states of said electronic equipment; and an operation unit, wherein said display unit rotates said facial image in a clockwise direction when an operation of said operation unit is carried out in a first rotational direction and rotates said facial image in a counterclockwise direction when the operation of said operation unit is carried out in a second rotational direction opposite to said first direction, and said plurality of facial features indicate one of a first, a second and an intermediate level of each of said plurality of states of said electronic equipment.

15. The communication apparatus according to claim 14, wherein said display unit is formed by a plurality of display areas each having a dot matrix.

16. The communication apparatus according to claim 14, further comprising means for changing among said display colors and said representations of said plurality of facial features.

17. The communication apparatus according to claim 14, further comprising means for changing said plurality of facial features as time passes.

18. The communication apparatus according to claim 16, wherein said means for changing among said display colors includes means for changing colors of said illumination unit.

19. The communication apparatus according to claim 14, wherein said facial image is one of a simplified man, animal, robot, and virtual creature.

20. The communication apparatus according to claim 14, wherein said detection unit includes means for detecting at least a state of a power source of said electronic equipment.

21. The communication apparatus according to claim 14, wherein said detection unit includes means for detecting at least a reception state detected by said communication apparatus.

22. The communication apparatus according to claim 21, wherein said reception state is a reception electric field intensity.

23. The communication apparatus according to claim 14, wherein said display unit displays a letter indicative of said state and said facial image.

24. The communication apparatus according to claim 17, further comprising:

an operation unit, wherein said display unit carries out a time-series change in response to an operation of said operation unit.

25. The communication apparatus according to claim 14, wherein said display unit rotates said facial image in one of a clockwise and counterclockwise direction during a time period beginning when a call is placed and ending when a called party answers said call.

* * * * *